United States Patent
Sandland et al.

(10) Patent No.: US 11,734,289 B2
(45) Date of Patent: *Aug. 22, 2023

(54) METHODS, SYSTEMS, AND MEDIA FOR PROVIDING A MEDIA SEARCH ENGINE

(71) Applicant: Google LLC, Mountain View, CA (US)

(72) Inventors: Nathan Leslie Sandland, Mountain View, CA (US); Jason Bayer, San Francisco, CA (US); Cheol Ho Park, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,829

(22) Filed: Jun. 24, 2022

(65) Prior Publication Data
US 2022/0318257 A1    Oct. 6, 2022

Related U.S. Application Data

(63) Continuation of application No. 16/846,736, filed on Apr. 13, 2020, now Pat. No. 11,372,866, which is a
(Continued)

(51) Int. Cl.
*G06F 16/2457* (2019.01)
*G06F 16/48* (2019.01)
(Continued)

(52) U.S. Cl.
CPC ...... *G06F 16/24578* (2019.01); *G06F 16/245* (2019.01); *G06F 16/24534* (2019.01);
(Continued)

(58) Field of Classification Search
CPC ............. G06F 16/24578; G06F 16/245; G06F 16/285; G06F 16/955; G06F 16/86;
(Continued)

(56) References Cited

U.S. PATENT DOCUMENTS 6,018,738 A    1/2000 Breese et al.
8,402,035 B2   3/2013 Artzt et al.
(Continued)

OTHER PUBLICATIONS

Notice of Allowance dated Feb. 17, 2015 in U.S. Appl. No. 13/833,449.
(Continued)

*Primary Examiner* — Baoquoc N To
(74) *Attorney, Agent, or Firm* — Byrne Poh LLP

(57) ABSTRACT

Methods, systems, and media for providing a media search engine are provided. In some implementations, a method for searching for content is provided, the method comprising: receiving a media search query for media assets; identifying web search results from a corpus of web resources that are responsive to the media search query, wherein each of the web search results has an associated relevancy score; determining keyword information and contextual information from a subset of the web search results, wherein the subset of the web search results is selected from the web search results based on the associated relevancy score and wherein media entities are determined from at least a portion of the keyword information and the contextual information; assigning a topic score for the each of the media entities based on occurrence in the web search results; selecting at least one media entity from the media entities based on the topic score; identifying media assets from a corpus of media assets based at least in part on the selected media entity; and causing a subset of the media assets to be presented to a user in response to the media search query.

19 Claims, 6 Drawing Sheets

Related U.S. Application Data continuation of application No. 15/727,839, filed on Oct. 9, 2017, now Pat. No. 10,621,187, which is a continuation of application No. 15/269,733, filed on Sep. 19, 2016, now Pat. No. 9,785,681, which is a continuation of application No. 14/720,490, filed on May 22, 2015, now Pat. No. 9,449,054, which is a continuation of application No. 13/833,449, filed on Mar. 15, 2013, now Pat. No. 9,063,984.

(51) Int. Cl.
| | |
|---|---|
| *G06F 16/84* | (2019.01) |
| *G06F 16/245* | (2019.01) |
| *G06F 16/28* | (2019.01) |
| *G06F 16/951* | (2019.01) |
| *G06F 16/955* | (2019.01) |
| *G06F 16/9535* | (2019.01) |
| *G06F 16/2453* | (2019.01) |

(52) U.S. Cl.
CPC ............ *G06F 16/285* (2019.01); *G06F 16/48* (2019.01); *G06F 16/86* (2019.01); *G06F 16/951* (2019.01); *G06F 16/955* (2019.01); *G06F 16/9535* (2019.01)

(58) Field of Classification Search
CPC ........... G06F 16/24534; G06F 16/9535; G06F 16/951; G06F 16/48
See application file for complete search history.

(56) References Cited

U.S. PATENT DOCUMENTS

| | | | |
|---|---|---|---|
| 8,706,841 | B2 | 4/2014 | Gordon et al. |
| 9,015,142 | B2 | 4/2015 | Fu |
| 9,063,984 | B1 | 6/2015 | Sandland et al. |
| 2003/0217052 | A1 | 11/2003 | Rubenczyk et al. |
| 2004/0006740 | A1 | 1/2004 | Krohn et al. |
| 2004/0153445 | A1 | 8/2004 | Horvitz et al. |
| 2005/0083792 | A1 | 4/2005 | Lee |
| 2007/0243928 | A1 | 10/2007 | Iddings |
| 2008/0133504 | A1 | 6/2008 | Messer et al. |
| 2009/0100051 | A1 | 4/2009 | Bhatt et al. |
| 2010/0107128 | A1 | 4/2010 | Thukral |
| 2010/0306249 | A1 | 12/2010 | Hill et al. |
| 2010/0325129 | A1* | 12/2010 | Ahuja ................. G06F 16/9535 707/769 |
| 2011/0225174 | A1 | 9/2011 | Artzt et al. |
| 2011/0258556 | A1 | 10/2011 | Kiciman et al. |
| 2012/0291056 | A1* | 11/2012 | Donoghue ......... H04N 21/4722 725/41 |
| 2013/0073336 | A1 | 3/2013 | Heath |
| 2013/0073387 | A1 | 3/2013 | Heath |
| 2013/0073389 | A1 | 3/2013 | Heath |
| 2013/0073473 | A1 | 3/2013 | Heath |
| 2013/0110978 | A1 | 5/2013 | Gordon et al. |
| 2013/0191380 | A1 | 7/2013 | Artzt et al. |
| 2013/0262230 | A1 | 10/2013 | King et al. |
| 2013/0325780 | A1* | 12/2013 | Prakash ................... G06N 5/02 706/46 |
| 2014/0136503 | A1* | 5/2014 | Kritt ..................... G06F 16/951 707/723 |
| 2014/0173666 | A1 | 6/2014 | Gordon et al. |
| 2014/0188925 | A1 | 7/2014 | Skolicki |
| 2014/0279248 | A1 | 9/2014 | Westpal |
| 2015/0058328 | A1 | 2/2015 | Fu |
| 2016/0019226 | A1 | 1/2016 | Srikrishna |
| 2017/0011044 | A1 | 1/2017 | Sandland et al. |

OTHER PUBLICATIONS

Notice of Allowance dated Feb. 25, 2022 in U.S. Appl. No. 16/846,736.
Notice of Allowance dated May 23, 2016 in U.S. Appl. No. 14/720,490.
Notice of Allowance dated Jun. 5, 2017 in U.S. Appl. No. 15/269,733.
Notice of Allowance dated Dec. 9, 2019 in U.S. Appl. No. 15/727,839.
Office Action dated Jan. 26, 2017 in U.S. Appl. No. 15/269,733.
Office Action dated Mar. 4, 2016 in U.S. Appl. No. 14/720,490.
Office Action dated Jul. 17, 2015 in U.S. Appl. No. 14/720,490.
Office Action dated Aug. 7, 2019 in U.S. Appl. No. 15/727,839.
Office Action dated Oct. 27, 2014 in U.S. Appl. No. 13/833,449.
Office Action dated Oct. 28, 2021 in U.S. Appl. No. 16/846,736.

* cited by examiner

METHODS, SYSTEMS, AND MEDIA FOR PROVIDING A MEDIA SEARCH ENGINE

CROSS-REFERENCE TO RELATED APPLICATIONS

This application is a continuation of U.S. patent application Ser. No. 16/846,736, filed Apr. 13, 2020, which is a continuation of U.S. patent application Ser. No. 15/727,839, filed Oct. 9, 2017, which is a continuation of U.S. patent application Ser. No. 15/269,733, filed Sep. 19, 2016, which is a continuation of U.S. patent application Ser. No. 14/720,490, filed May 22, 2015, which is a continuation of U.S. patent application Ser. No. 13/833,449, filed Mar. 15, 2013, each of which is hereby incorporated by reference herein in its entirety.

TECHNICAL FIELD

The disclosed subject matter relates to methods, systems, and media for providing a media search engine.

BACKGROUND

There is an overwhelming volume of content that is available to the average consumer. For example, with respect to media content, there are many applications that a consumer can use on a television or set-top box that allow the consumer to consume media content from various sources (e.g., media content that is delivered linearly from a multichannel video programming distributor, video-on-demand content that is provided by a multichannel video programming distributor, personal media content that is acquired by the consumer, recorded content that is stored on a digital video recorder or any other suitable storage device, and/or on-demand content that is provided from over-the-top providers).

As the number of sources and the volume of content continue to increase, consumers are increasingly reliant on search engines, where a consumer can formulate a search query that includes search constraints that identify what information is being sought. Search engines have been developed that receive such search queries and return search results responsive to the search query. This approach may be suitable when the keywords used in the search query are the same or similar to the indexed keywords used in a database.

However, in some instances, search queries can include keywords that are not included in the database. For example, these search queries can provide a description of a content item (e.g., a description of a movie plot, a text portion of a storyline, etc.). When such search queries are used, the indexing database is likely to return irrelevant search results.

Accordingly, the need exists for new systems, methods, and media for providing a media search engine.

SUMMARY

Method, systems, and media for providing a media search engine are provided.

In accordance with some implementations of the disclosed subject matter, a system for searching for content is provided. The system comprises a hardware processor that is configured to: receive a media search query for one or more media assets; identify a plurality of web search results from a corpus of web resources that are responsive to the media search query, wherein each of the web search results has an associated relevancy score; determine keyword information and contextual information from a subset of the web search results, wherein the subset of the web search results is selected from the plurality of web search results based on the associated relevancy score and wherein a plurality of media entities are determined from at least a portion of the keyword information and the contextual information; assign a topic score for the each of the plurality of media entities based on occurrence in the web search results; select at least one media entity from the plurality of media entities based on the topic score; identify a plurality of media assets from a corpus of media assets based at least in part on the selected media entity; and cause a subset of the plurality of media assets to be presented to a user in response to the media search query.

In accordance with some implementations of the disclosed subject matter, a method for searching for content is provided, the method comprising: receiving, using a hardware processor, a media search query for one or more media assets; identifying, using the hardware processor, a plurality of web search results from a corpus of web resources that are responsive to the media search query, wherein each of the web search results has an associated relevancy score; determining, using the hardware processor, keyword information and contextual information from a subset of the web search results, wherein the subset of the web search results is selected from the plurality of web search results based on the associated relevancy score and wherein a plurality of media entities are determined from at least a portion of the keyword information and the contextual information; assigning, using the hardware processor, a topic score for the each of the plurality of media entities based on occurrence in the web search results; selecting, using the hardware processor, at least one media entity from the plurality of media entities based on the topic score; identifying, using the hardware processor, a plurality of media assets from a corpus of media assets based at least in part on the selected media entity; and causing, using the hardware processor, a subset of the plurality of media assets to be presented to a user in response to the media search query.

In accordance with some implementations of the disclosed subject matter, a non-transitory computer-readable medium containing computer-executable instructions that, when executed by a processor, cause the processor to perform a method for searching for content is provided. The method comprises: receiving a media search query for one or more media assets; identifying a plurality of web search results from a corpus of web resources that are responsive to the media search query, wherein each of the web search results has an associated relevancy score; determining keyword information and contextual information from a subset of the web search results, wherein the subset of the web search results is selected from the plurality of web search results based on the associated relevancy score and wherein a plurality of media entities are determined from at least a portion of the keyword information and the contextual information; assigning a topic score for the each of the plurality of media entities based on occurrence in the web search results; selecting at least one media entity from the plurality of media entities based on the topic score; identifying a plurality of media assets from a corpus of media assets based at least in part on the selected media entity; and causing a subset of the plurality of media assets to be presented to a user in response to the media search query.

In accordance with some implementations of the disclosed subject matter, a system for searching for content is provided, the system comprising: means for receiving a media search query for one or more media assets; means for identifying a plurality of web search results from a corpus of web resources that are responsive to the media search query, wherein each of the web search results has an associated relevancy score; means for determining keyword information and contextual information from a subset of the web search results, wherein the subset of the web search results is selected from the plurality of web search results based on the associated relevancy score and wherein a plurality of media entities are determined from at least a portion of the keyword information and the contextual information; means for assigning a topic score for the each of the plurality of media entities based on occurrence in the web search results; means for selecting at least one media entity from the plurality of media entities based on the topic score; means for identifying a plurality of media assets from a corpus of media assets based at least in part on the selected media entity; and means for causing a subset of the plurality of media assets to be presented to a user in response to the media search query.

In some implementations, the system further comprises means for rewriting the media search query by inserting one or more media terms prior to identifying the plurality of web search results from the corpus of web resources.

In some implementations, the system further comprises means for parsing the keyword information from the subset of the web search results.

In some implementations, the system further comprises means for incrementing the topic score for a media entity upon determining that a page corresponding to a web search result relates to the media entity.

In some implementations, the system further comprises means for accessing an entity table that maps a web resource identifier corresponding to a web search result to a media entity, wherein the web resource identifier comprises a link to a related website.

In some implementations, the system further comprises: means for determining a quality score for each of the plurality of identified media assets; and means for filtering the at least a subset of the plurality of media assets based on the determined quality score.

In some implementations, the system further comprises: means for identifying a second plurality of media assets from a media data feed that are responsive to the media search query; and means for causing a plurality of one or more the plurality of media assets, one or more of the plurality of web search results, and one or more of the second plurality of media assets to the user in response to the media search query.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
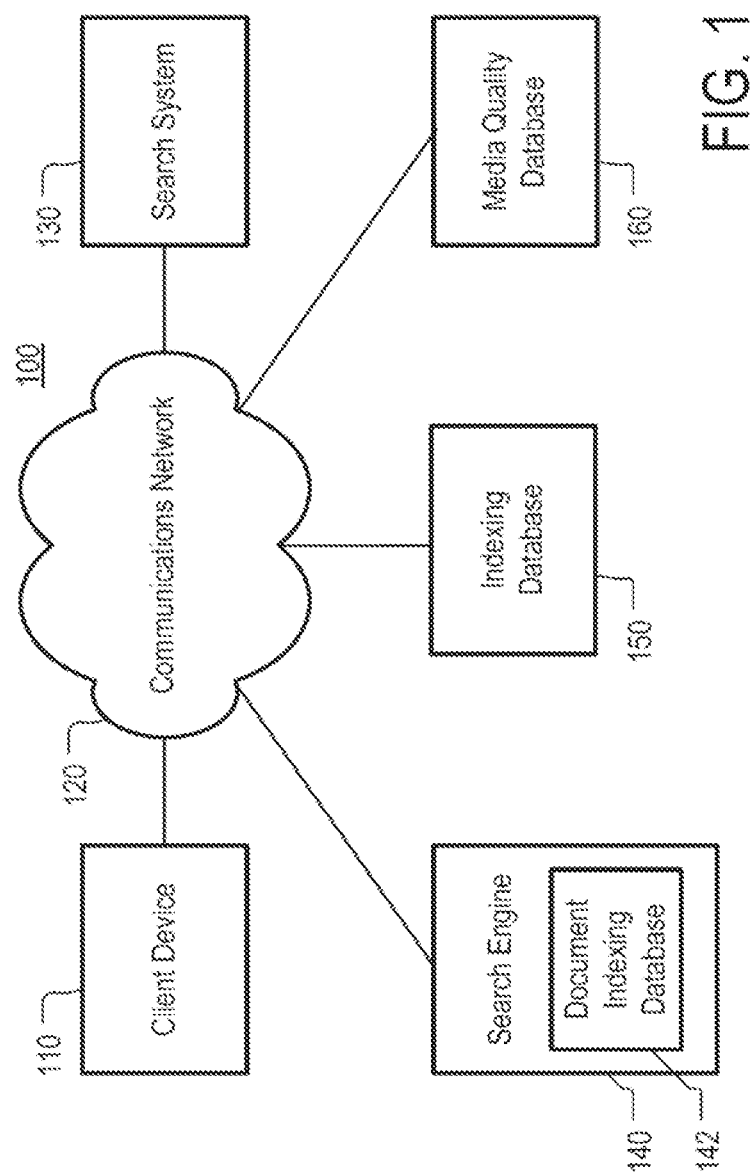
FIG. 1 is an example of a system for providing a media search engine in accordance with some implementations of the disclosed subject matter.

In some implementations, mechanisms (which can include methods, systems, and media) for providing a media search engine are provided.

The mechanisms can receive a media search query for media content that is submitted by a user. For example, a user using a television device can input a search query that specifies a movie that the user is interested in. In a more particular example, the search query can provide a topical description of the movie, a description of a character in the movie (e.g., the search query can include the terms "conscientious serial killer"), a description of a movie plot of storyline (e.g., the search query can include the terms "blackjack card counters" or "little girl assassin"), or a description of any other suitable characteristic of the movie.

In response to receiving the media search query, the mechanisms can perform a search of a corpus of web resources for web search results responsive to the media search query. As used herein, a corpus is a collection of resources and each corpus can include resources of multiple types. For example, a web corpus can include documents, images, video content, audio content, etc. In another example, a media corpus can include media content, such as a collection of programs that can include television programs, on-demand programs, over-the-top content, recorded content, etc.

It should be noted that each search result that is associated with a web resource (e.g., a link to an HTML document, an image, a video, etc.) can also be associated with a relevancy score. For example, performing a web search of a corpus of web resources provides one or more relevant web search results, where each of the search results has a relevancy score based on matching the search terms with the search result. Documents and other web resources that include a greater number of the search terms can be identified as more relevant or having a higher relevancy score than documents that include a fewer number of the search terms. A subset of the web search results can be selected based in part on the relevancy score (e.g., the more relevant web search results, the top hits, etc.).

In some implementations, the mechanisms can determine keyword information (e.g., one or more keywords) and contextual information from a subset of the web search results. For example, keywords and contextual information can be extracted from the top N web pages (e.g., in the form of uniform resource locators) out of the multiple web search results. The mechanisms can then determine one or more media entities from at least a portion of the keyword information and contextual information. It should be noted that media entities can include, for example, a title, an identifier, an episode number, a season number, a category, an actor, a producer, a characteristic, a location, or any other suitable information relating to the media content. In a more particular example, the mechanisms can crawl and/or analyze one or more web pages and determine media entities that appear within the pages and/or media entities that describe the context of the page. Media entities can be determined using any suitable approach, such as clustering keywords or extracting media entities from portions of a page. For example, media entities can be selected in response to determining that a particular media entity is associated with particular keywords from the keyword information and/or particular characteristics from the contextual information. In some implementations, an entity table that maps media entities to web resources can be accessed.

Upon identifying media entities from a subset of the web search results, a topic score or entity score can be determined for each of the identified media entities. For example, the mechanisms can calculate a topic score for an identified media entity by determining the number of times that particular media entity appears in the subset of web search results. In another example, the mechanisms can calculate a topic score for an identified media entity by determining the number of times that a web search result describes the media entity or includes a keyword or term that is associated with the media entity. In yet another example, the mechanisms can analyze the corpus of web resources. In a more particular example, a hash table can be created based on the media entities in the web resources, where each media entity in a web resource can be identified and hashed. A count value in the corresponding entry in the hash table can then be incremented. Once the corpus of web resources has been analyzed, the count values can reflect which media entities occurred more often and which media entities occurred less often in the web resources (or a subset of web resources). The mechanisms can, in some implementations, select the media entity or entities that appear more than a threshold amount.

The mechanisms can use the selected media entity or entities to generate a search query and perform a search of a corpus of media content for media item identifiers. For example, when the mechanisms are implemented on a television device, a search query can be generated based at least in part on the one or more media entities and the search query can be used to search through a media data feed for media content that can be provided by the television device. The media item identifiers or a subset of the media item identifiers can be presented to a user in response to the media search query.

In some implementations, the mechanisms can present the user with media content identifiers, where the user can select a media content identifier to access the corresponding media item (e.g., tune to a channel providing a television program, download video content, access a recorded version of the media item, provide an interface for purchasing the media item for playback, etc.). In some implementations, the mechanisms can present the user with media content identifiers that represent media content along with one or more web search results (e.g., links to HTML documents, images, videos, and other content responsive to the media search query). It should be noted that the media content identifiers can be supplemented with any suitable search result (e.g., a title-based video search, web search results, image search results, etc.).

It should also be noted that, although the implementations described herein generally relate to searching for media content, this is merely illustrative. The mechanisms described herein can be applied to obtaining search results relating to particular people (e.g., actors, directors, etc.), particular places, particular products, particular sports teams, particular performances, particular brands or manufactures, particular organizations, etc.

These mechanisms can be used in a variety of applications. For example, these mechanisms can be used to provide the user with media search results from multiple corpuses in response to an unstructured or freestyle query (e.g., media content that is associated with a "conscientious serial killer"), In another example, these mechanisms can be used to enhance media search engines with information from web resources. In yet another example, these mechanisms can use entities to determine a confidence in the media search results presented to a user.

Turning to FIG. 1, FIG. 1 shows an illustrative example of a system 100 for providing a media search engine in accordance with some implementations of the disclosed subject matter. System 100 can include a client device 110, a communications network 120, a search system 130, a search engine 140, an indexing database 150, a media quality database 160, and/or any other suitable component. Client device 110 can be implemented as a personal computer, a laptop computer, a smartphone, a mobile telephone, a tablet computer, a gaming device, a digital media receiver, a set-top box, a smart television, a media player; or any other suitable device.

Communications network 120 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications network 120 can include any suitable links suitable for communicating data among client device 110 and search system 130, such as network links, dial-up links, wireless links, hard-wired links, any other suitable communications links, or any suitable combination of such links.

Search system 130 can include one or more computing devices configured to process search queries and identify content based on the search queries. In some implementations, the content can include media content, such as video recordings (e.g., movies, television programs, user-generated video clips, etc.), audio recordings, animation recordings, or any other suitable type of audiovisual content. In addition, in some implementations, the content can include non-audiovisual content, such as documents (e.g., web pages), images, and/or any other suitable type of information and/or data.

Search engine 140 can include hardware and/or software for performing document searches (e.g., searching the Internet). Search engine 140 can include at least one of: an Internet search engine (e.g., a publically available Internet search engine); a desktop search engine; a database search engine; and any other suitable type of search engine. In some implementations, search engine 140 can include a document indexing database 142. Document indexing database 142 can include hardware and/or software for searching a first corpus of data. Any suitable first corpus of data can be used. In some implementations, the first corpus of data can include a plurality of documents. Additionally or alternatively, in some implementations, the first corpus of data can include any other suitable type of content, such as media content. In some implementations, search engine 140 can be configured to: receive a search query; use document indexing database 142 to identify a plurality of identifiers of documents that are related to media entities that the search query is based; rank the plurality of documents; and return identifiers of documents from the plurality that have been ranked at the top as search results corresponding to the search query. In some implementations, search engine 140 can also provide a relevancy score that indicates the inclusion of one or more keywords in the search query. For example, documents that contain a greater number of the search terms can be identified as more relevant than documents that contain a fewer number of the search terms.

In some implementations, search engine 140 can determine one or more media entities associated with search results (e.g., web URLs) and generate topic scores for each of the media entities. For example, search engine 140 can calculate a topic score for a determined media entity by determining the number of times that particular media entity appears in the subset of web search results. In a more particular example, search engine 140 can analyze the corpus of web resources and create a hash table based on the media entities in the web resources, where each media entity in a web resource can be identified and hashed. A count value in the corresponding entry in the hash table can then be incremented. Once the corpus of web resources has been analyzed, the count values can reflect which media entities occurred more often and which media entities occurred less often in the web resources (or a subset of web resources).

Indexing database 150 can include hardware and/or software for searching through a second corpus of data. The second corpus of data can include media content (e.g., movies, television programs, video clips, audio recordings, and/or any other suitable type of media content), images, documents, and/or any suitable type of content. In some implementations, indexing database 150 can relate identifiers for content items from the second corpus of data to media entities that are associated with the content items. Each identifier can include a title (e.g., a movie title or a document file), an address of a file (e.g., an address of a multimedia file or a document file), or any other suitable information. The media entities related to each content item identifier can indicate the genre of the content item, a topic of the content item, and/or any other suitable characteristic of the content item. In some implementations, indexing database 150 can be configured to: receive a search query based on one or more media entities; determine a content item identifier that is associated with one or more of the media entities; and provide the identifier as part of search result(s) corresponding to the search query.

Additionally or alternatively, in some implementations, the second corpus of data can include audiovisual content items and non-audiovisual content items that are related to the audiovisual content items. For example, non-audiovisual content items that are related to visual content items can include web pages that are dedicated to a particular movie, web pages with movie scripts, web pages with movie reviews, web pages with song lyrics, or any other suitable content that is in some way related to an audiovisual content item.

In some implementations, the second corpus of data can include fewer types of content items than the first corpus of data. For example, the second corpus of data can be limited to one or more of media content (e.g., movie files and/or movie identifiers), health records, or financial records, whereas the first corpus of data can include a large amount of web content that is found on one or more web resources.

In some implementations, the second corpus of data can be smaller than the first corpus of data. For example, the first corpus of data can include all web content that is found on one or more web resources, while the second corpus of data can include data that is collected or selected by administrative users that manage indexing database 150.

In some implementations, indexing database 150 can include a specialized database. For example, indexing database 150 can be a database of information about particular media content. In a more particular example, these databases can be used to search only for movies. As another example, the second corpus of data can include another type of specialized database, such as a database of financial records or a database of health records. Indexing database can include any suitable type of database, in some implementations.

In some implementations, system 100 can include a media quality database 160 or any other suitable storage device that contains media quality scores. Media quality database 160 can include hardware and/or software for identifying one or more quality metrics for a particular media content item. By way of example, the quality metrics can indicate at least one of:

Q1: a quality of video in a content item (e.g., a resolution, an encoding bit rate, a clarity of image, or any other suitable metric);
Q2: a quality of audio in a content item (e.g., an encoding bit rate, a clarity of sound, a number of sound channels);
Q3: a popularity of a content item among viewers or listeners (e.g., click rate); and
Q4: an availability of a content item (e.g., whether a server streaming the content item has sufficient network bandwidth to stream the content item to a user).

In some implementations, the quality metrics for a media content item that are stored in media quality database 160 can be determined by aggregating feedback on the content item that is provided by a plurality of users on the Internet. In some implementations, media quality database 160 can be configured to receive media search results that are responsive to an identified media entity and provide a quality metric associated with the content item associated with a media search result. These quality metrics can be used to further filter and/or enhance media search results to present to the user in response to a media search query.

Although search system 130, document search engine 140, indexing database 150, and media quality database 160 are depicted as separate systems, in some implementations, any number of them can be integrated together. For example, search system 130, document search engine 140, document indexing database 142, indexing database 150, and media quality database 160 can be integrated together as a single system (standalone or distributed). In that regard, each of indexing database 150 and media quality database 160 can be implemented as a standalone device (e.g., a server) or as a file or another type of data structure that is stored in a memory of search system 130.

Figure 2:
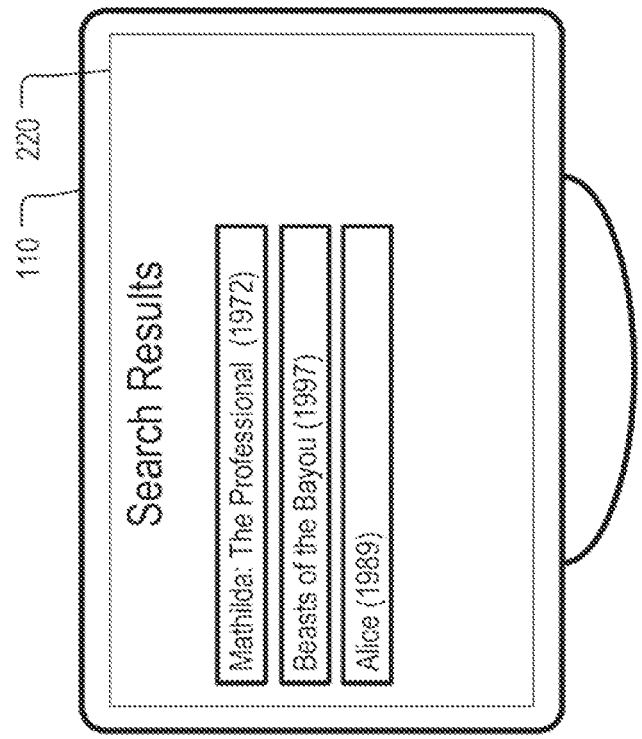
FIG. 2 depicts an example of a user interface for searching for media content in accordance with some implementations of the disclosed subject matter.
Figure 2:
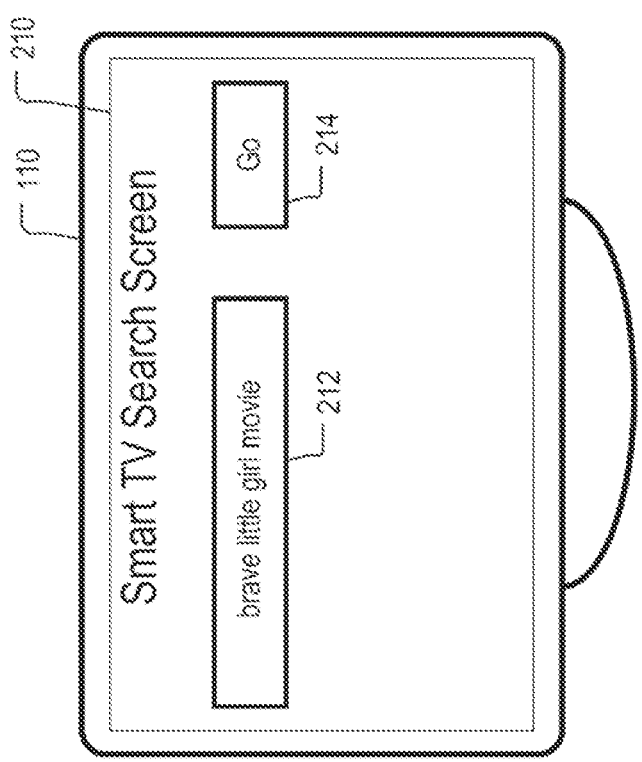

FIG. 2 shows an illustrative example of a graphical user interface that can be presented by client device 110 in accordance with some implementations of the disclosed subject matter. As shown, client device 110 can be a smart television that is configured to present a user with a search interface 210. Search interface 210 can include, for example, an input field 212 and a search button 214. As also shown, the user of client device 110 has inputted the search query "brave little girl" into input field 212 and, in response to button 214 being selected (e.g., using a user input device, such as a remote control), the search query in input field 212 can be transmitted to search system 130 of FIG. 1. A response from search system 130 can be received and presented on a search results interface 220. The response can include the search results in any suitable form. For example, the search results can include text, images, audio, or any other suitable type of content. In some implementations, the search results can include one or more links to content items which, when activated, can cause client device 110 to access the corresponding media content item (e.g., a movie, a television program, a video, etc.).

Figure 3:
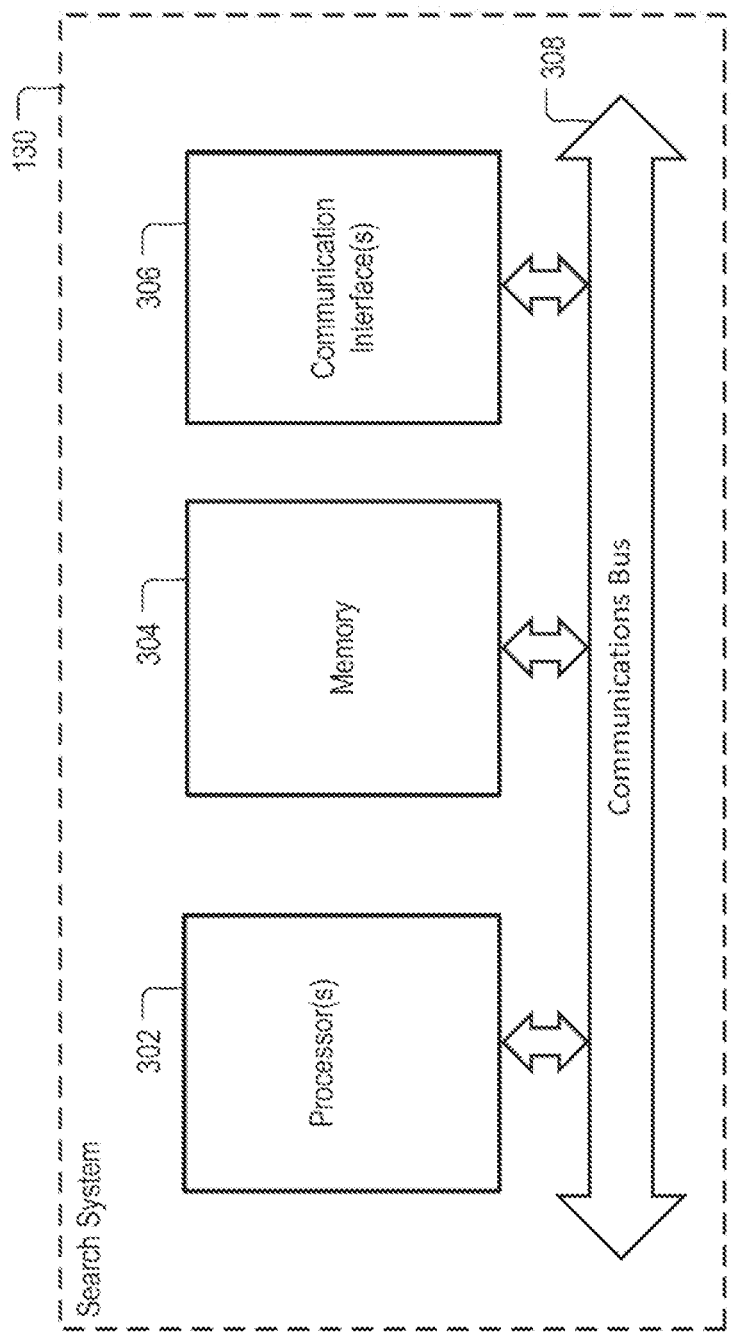
FIG. 3 is a block diagram of an example of hardware for providing a media search engine in accordance with some implementations of the disclosed subject matter.

FIG. 3 depicts an example of hardware 300 that can be used to implement search system 130 in accordance with some implementations of the disclosed subject matter. As illustrated in FIG. 3, hardware 300 can include hardware processor(s) 302, memory 304, communication interface(s) 306, and a communications bus 308. Hardware processor(s) 302 can be any suitable hardware processor(s), such as one or more microprocessors, microcontrollers, digital signal processors, programmable logic devices, field-programmable gate arrays (FPGAs), application-specific integrated circuits (ASICs), etc., and can include a multi-core processor (e.g., dual-core, quad-core, hexa-core, or any suitable number of cores) or a supercomputer, in some implementations. Memory 304 can be any volatile or non-volatile memory (e.g., RAM, a solid state drive (SSD), or a hard disk) and/or a remote memory. Communications interface(s) 306 can include one or more communications network adapters and communications interface(s) 306 can enable the hardware and/or software to communicate with other communications networks (e.g., such as the Internet, wired networks, wireless networks, etc.), other equipment, and/or any other suitable networks, devices, etc. Communications bus 308 can include a PCI bus, a PCIe bus, or any other type of bus. In instances where search system 130 is a distributed system, bus 308 can be implemented using one or more communications networks.

Figure 4:
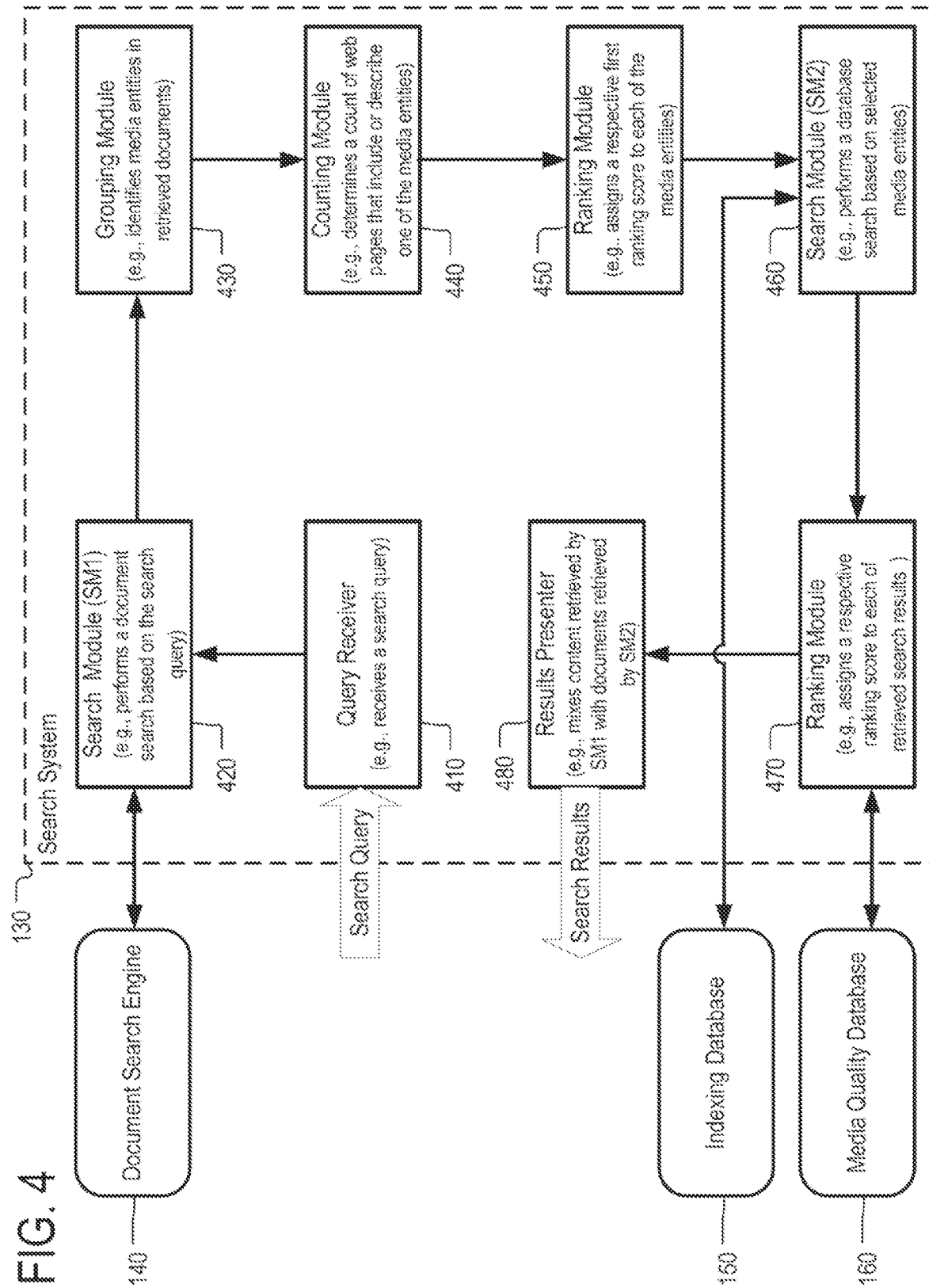
FIG. 4 is block diagram of an example of a system for providing a media search engine in accordance with some implementations of the disclosed subject matter.

FIG. 4 depicts an example of an organization of search system 130 in accordance with some implementations of the disclosed subject matter. As illustrated, search system 130 can include a query receiver module 410, a search module 420, a grouping module 430, a counting module 440, a ranking module 450, a search module 460, a ranking module 470, and a presenter module 480. Any of modules 410-480 can be implemented in software as one or more processor-executable instructions, in hardware (by using a processor), or in both software and hardware. In some implementations, any number of modules 410-480 can be integrated together as a single device. Additionally or alternatively, in some implementations, any number of modules 410-480 can be implemented as separate devices. In that regard, in some implementations, search system 130 can be either a standalone device or a distributed system.

Receiver module 410 can be configured to receive a search query from a client device, such as client device 110. As described above, the search query can be a media search query for one or more media assets and the search query can include one or more search terms. In a more particular example, the search terms can describe the one or more desired media assets (e.g., media content that corresponds to "brave little girl" shown in FIG. 2). Each word can be a natural language word, a number, a string, or an alphanumerical string. Receiver module 410 can provide the search query to search module 420.

In some implementations, receiver module 410 can also modify the search terms provided by the user. For example, receiver module 410 can rewrite the search query to include media terms, such as "video" or "television movie." In another example, receiver module 410 can generate multiple search queries by supplementing search terms with additional media terms (e.g., "brave little girl movie," "brave little girl video," "brave little girl television theme," etc.).

In some implementations, receiver module 410 can detect the language of the search terms provided by the user. For example, in response to detecting that one or more search terms are non-English, receiver module 410 can translate the non-English search terms and insert the translated search terms into the search query. In another example, receiver module 410 can compare the term to a dictionary of English words and phrases.

In some implementations, receiver module 410 can use natural language processing techniques to enhance the search query. For example, receiver module 410 can determine whether a search term or terms is associated with a common word or phrase (e.g., "right now"). In response to detecting a common word or phrase, receiver module 410 can communicate with other components (e.g., ranking module 470 or results presenter 480) so that media search results can be filtered accordingly. In this example, the common phrase "right now" can be interpreted by receiver module 410 to cause media search results to be filtered such that one criterion of a presented media search result is that the media item is currently available.

Search module 420 can be configured to use the search query to perform a document search. Search module 420 can provide the search query to search engine 140 and receive search results that identify a plurality of documents that match the search query. Search module 420 can provide a first set of documents from the plurality to grouping module 430.

Grouping module 540 can be configured to process each document or search result in the first set of search results to determine one or more media entities. Media entities can include any suitable natural language words, numbers, strings, or alphanumerical strings that are found in the document. For example, grouping module 540 can access an entity table that maps particular media entities to particular documents (e.g., a webpage). In response to inputting the various documents in the search results, grouping module 540 can obtain multiple media entities associated with the search results. In some implementations, a subset of the search results (e.g., the top N ranked search results) can be inputted into the entity table to obtain one or more media entities. It should be noted that any suitable clustering approaches can be used for selecting media entities. Such clustering approaches can enhance the set of media entities by, for example, assigning a weight to extract representative media entities, assigning weights to group particular media entities, etc.

In some implementations, the media entities extracted from the pages associated with the first set of search results can be transmitted to a counting module 440. Counting module 440 can be configured to determine the incidence of each media entity within the first set of search results. For each media entity, counting module 440 can analyze the corpus of web resources and create a hash table based on the media entities in the web resources, where each media entity in a web resource can be identified and hashed. A count value in the corresponding entry in the hash table can then be incremented. Once the corpus of web resources has been analyzed, the count values can reflect which media entities occurred more often and which media entities occurred less often in the web resources (or a subset of web resources).

In some implementations, the media entities and their associated topic scores can be transmitted to a ranking module 450. Ranking module 450 can rank the media entities based on topic score (e.g., from highest topic score to lowest topic score) and select one or more media entities. For example, ranking module 450 can order media entities and/or sets of media entities based on topic score and can select a first-ranked media entity or set of media entities for generating a media search query.

In some implementations, the selected media entity can be transmitted to a search module 460. Search module 460 can be configured to perform one or more searches of indexing database 150. More particularly, search module 460 can generate one or more search queries based in part on the selected media entity or set of media entities. For example, each search query can include one or more media entities from a set of selected media entities and/or each search query can be based on a particular media entity. The search query can be transmitted to indexing database 150 that contains media content.

As described above, in some implementations, the search query generated by search module 460 can be modified to include media terms, such as "movie" or "television program." For example, search module 460 can enhance the search query by supplementing search terms that incorporate one or more media entities with additional media terms (e.g., "brave little girl movie," "brave little girl television program," etc.).

In response to transmitting the search query to indexing database 150, search module 460 can receive media search results responsive to the search query from indexing database 150. For example, the media search results can include links or media item identifiers for presentation to the user.

In some implementations, the system can include a ranking module 470 that is configured to apply media quality scores or any other suitable quality metric to the content items identified in the search results. As shown in FIG. 4, media quality scores or quality metrics can be obtained from media quality database 160. These media quality scores can include an indication of popularity (e.g., the number of times users have selected a content item), an indication of the quality of the video or audio in a content item, an indication of the availability of a content item, or any other suitable quality metric.

In response to obtaining media quality scores from media quality database 160, ranking module 470 can assign a ranking score to each of the content items. For example, ranking module 470 can assign a media quality score to each of the content items and rank the content items based on the media quality score. In another example, ranking module 470 can obtain multiple media quality scores from media quality database 160 (e.g., a popularity score and an availability score), generate a ranking score based on the multiple quality scores (e.g., where each media quality score is assigned a particular weight), and rank the content items based on the ranking score. Based on the ranking scores, one or more content items identified in the search results can be provided to a results presenter 480.

Results presenter 480 can cause the one or more content items identified in the search results to be presented to a user of client device 110. For example, results presenter 480 can transmit the one or more content items in the form of content identifiers to client device 110, where the user of client device 110 can select a content identifier to retrieve the corresponding media content item (e.g., order an on-demand movie, record a television program or set a series recording, download over-the-top content from a suitable content provider, etc.). In some implementations, results presenter 480 can cause additional content to be provided along with the one or more content items, such as web search results from search module 420, title-based media search results using a media search engine, video search results using document search engine 140, etc.

Accordingly, search system 130 can, in response to receiving an unstructured media search query, process information from multiple corpuses of content (e.g., web content, media content, etc.) and obtain media content items based on relevancy scores (e.g., from a web search engine, such as search module 420), topic scores from identified media entities (e.g., from counting module 440), and/or media quality scores (e.g., from media quality database 160). More particularly, in response to receiving an unstructured media search query, media content search results can be obtained based on media entities extracted from web search results that are obtained using the media search query.

Figure 5A:
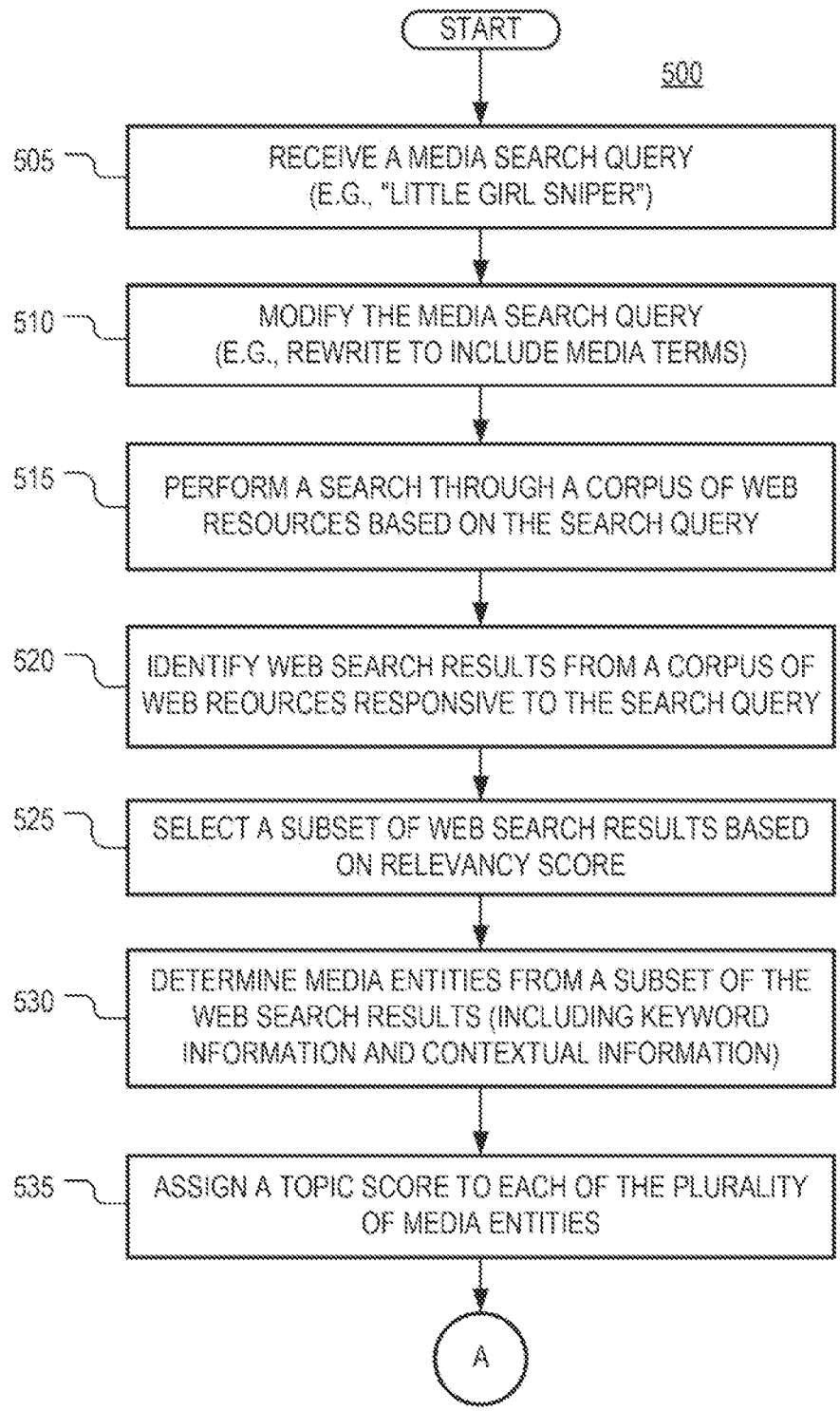
FIGS. 5A and 5B depict a flowchart of an example of a process for providing a media search engine in accordance with some implementations of the disclosed subject matter.
Figure 5B:
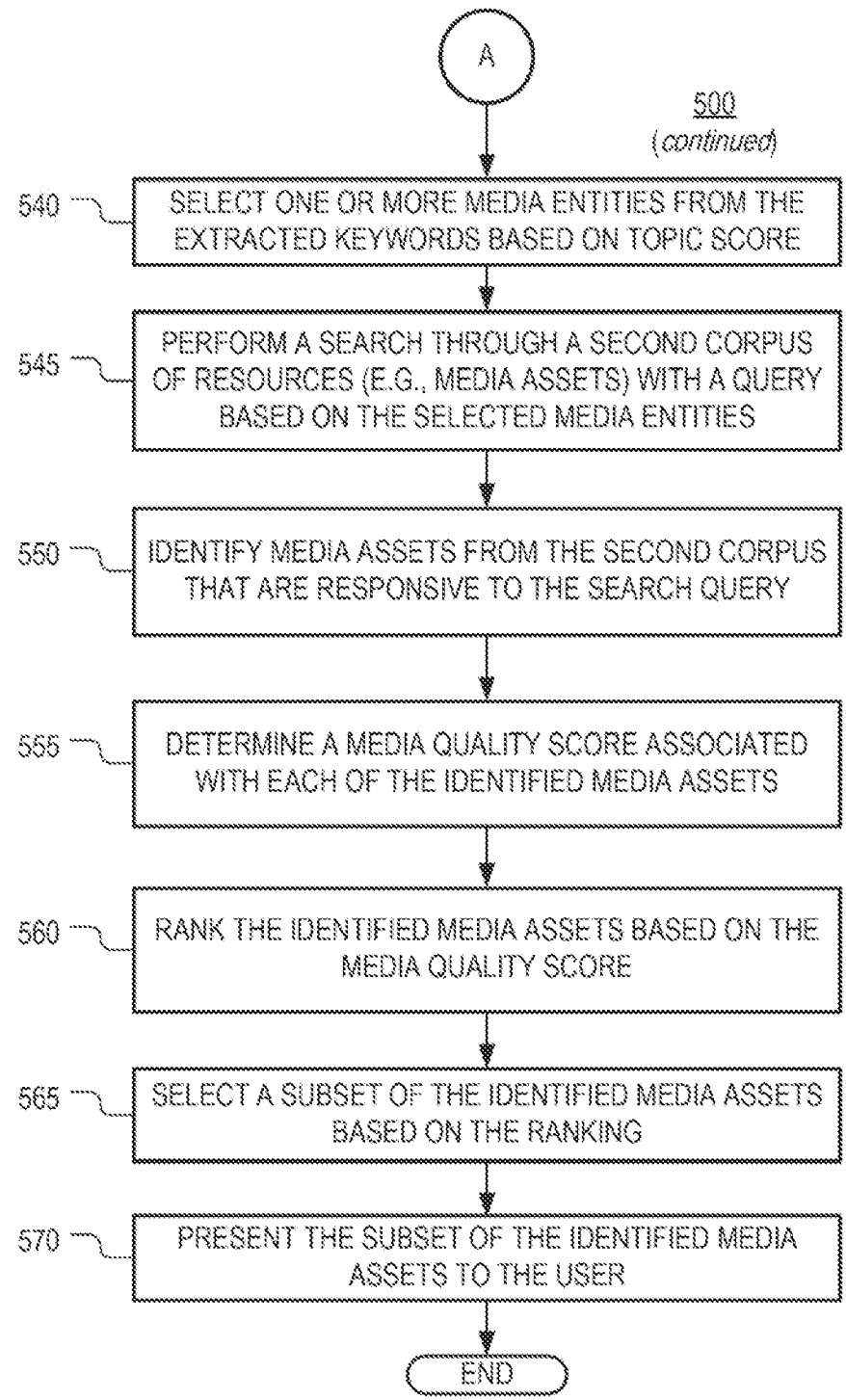

FIGS. 5A and 5B depict a flowchart of a process 500 for providing a media search engine in accordance with some implementations of the disclosed subject matter. At 505, a media search query can be received. The media search query can be received from a user input device (e.g., a keyboard) or from a client device (e.g., a media player, a mobile phone, or a personal computer) over a communications network. It should be noted that the media search query can be an unstructured query that includes any suitable number of words (e.g., "little girl sniper"). Each word can be a natural language word, a number, or any suitable alphanumerical string.

It should be noted that, although the implementations described herein generally relate to receiving a media search query and obtaining media content items as search results, this is merely illustrative. Any suitable content can be used with the mechanisms described herein. For example, an unstructured search query for finding an actor can be received and, in response to processing information from a corpus of web resources or any other suitable information, a list of actors matching the unstructured search query can be provided to the user.

At 510, the media search query can be modified to enhance the search query. For example, in some implementations, the media search query can be rewritten to include common media terms, such as "television program," and "movie." In this example, multiple search queries can be generated by including a different common media term in each search query. The multiple search queries can be submitted to a corpus of web resources and the results can be ranked and/or filtered. In another example, a media entity can be identified within the unstructured search query and, in response to detecting a particular media entity, a particular media term can be included in the modified search query. In this example, in response to detecting the phase "action" within the search query, the media term "movie" can be included in the modified search query.

In some implementations, the language used in the media search query can be detected. In response to detecting that one or more search terms included in the media search query are non-English, the non-English terms can be transmitted to a translation service that provides one or more translated terms for replacing in the search query. That can include using, for example, a dictionary of English words and phrases, where each search term is compared against terms in the dictionary. In some implementations, user preferences on a client device that include a language setting can be retrieved to determine the language of the one or more search terms included in the media search query.

It should be noted that any suitable approach for rewriting the media search query can be used. For example, search terms within the search query can be replaced with a synonym in the modified search query.

It should also be noted that, in some implementations, natural language processing techniques can be used to detect the presence of particular words or phrases within the media search query. For example, natural language processing techniques can be used to determine whether a search term or terms are associated with a common word or phrase (e.g., "right now"). In response to detecting a common word or phrase, media search results can be filtered. In this example, the common phrase "right now" can be interpreted to cause media search results to be filtered such that one criterion of a presented media search result is that the media item is currently available. Any suitable techniques can be used to filter results from the search corpus, include extended results within the search corpus, restrict the search corpus with one or more filers, etc.

At 515, process 500 can perform a search through a corpus of web resources based on the search query received at 505 or the search query modified at 510. As described above, the corpus of web resources can include any suitable collection of documents and any suitable type of content. For example, the documents can include web pages (e.g., HTML files), word processing documents, Portable Document Format (PDF) documents, or any other suitable type of documents. In another example, the corpus of web resources can also include images, audio clips, video content, etc. In some implementations, a search application programming interface (API) can be provided to search various content sources for search results responsive to the generated search query. For example, the media search query in its unstructured form can be transmitted to a search engine using the search application programming interface and search results responsive to the search query can be obtained.

Web search results from the corpus of web resources that are responsive to the search query can be identified at 520. It should be noted that the web search results can include a list with identifiers of the documents. Additionally or alternatively, in some implementations, each of the web search results the search can include a relevancy score. Each relevancy score can be specific to a particular document and can indicate a degree to which the document is estimated by the search engine to satisfy the search query. For example, a document (e.g., a web page, a piece of video content, etc.) that contains one or more of the search terms in the search query can be identified as relevant. Documents that include a greater number of the search terms can be identified as more relevant than documents that include a fewer number of the search terms. The relevancy score for each of the web search results can be provided by, for example, a web search engine, such as search engine 140 (FIG. 1).

In some implementations, a subset of the web search results can be selected at 525. This can be based, for example, on the relevancy score associated with each of the web search results. In a more particular example, the subset of web search results can be selected by ranking the web search results by relevancy score and selecting the top N highest search results. In another more particular example, the subset of web search results can be selected by determining whether the relevancy score is greater than a particular threshold value. If the relevancy score is greater than the particular threshold value, the particular web search result is retained for further processing. Otherwise, web search results having relevancy scores less than the particular threshold value can be discarded. It should be noted that, in some implementations, the relevancy score can be combined with other suitable scores, such as a popularity score indicating the popularity of the particular web resource (e.g., the number of clicks, the number of links to the web resource, etc.).

In some implementations, upon obtaining the subset of web search results, one or more media entities can be determined from the subset of web search results at 530. As described above, media entities can include any suitable natural language words, numbers, strings, or alphanumerical strings that are found in the document. In order to determine such media entities, an entity table that maps particular media entities to particular documents (e.g., a webpage) can be accessed. For example, the determination of whether a media entity is associated with a particular web search result can be performed by a table lookup operation. It should also be noted that such an entity table can be generated prior to receiving the media search query by crawling and/or analyzing the contents of the web resources. In addition, in some implementations, media entities can be determined from keywords that appear on the pages of the web search results (e.g., frequently occurring terms) and/or contextual information that is described on the pages of the web search results (e.g., a particular grouping of terms indicates that page describes a particular media entity).

It should be noted that, in some implementations, obtaining the subset of web search results and determining media entities from the subset of web search results can be performed concurrently using the entity table. For example, a link to the entity mapping table can be annotated in the web index, such as document indexing database 142 (FIG. 1).

In some implementations, each of the media entities determined from the pages associated with the first set of search results can be assigned a topic score at 535. For example, the topic score can be based on a determination of the incidence of a media entity within the subset of web search results. In another example, the topic score can be based on a determination of the incidence of a media entity within all of the web search results. In yet another example, the topic score can be based on a determination of the incidence or occurrence of terms within a group of terms associated with a media entity. For each media entity, one or more web resources can be analyzed and a hash table can be created based on the media entities in the web resources, where each media entity in a web resource can be identified and hashed. A count value in the corresponding entry in the hash table can then be incremented. Once the corpus of web resources has been analyzed, the count values can reflect which media entities occurred more often and which media entities occurred less often in the web resources (or a subset of web resources).

It should be noted that the topic scores can be determined using any suitable approach. For example, a topic score can be determined for a group of media entities when a document satisfies a predetermined similarity criterion. In a more particular example, the similarity criterion can be satisfied when the document includes all or a predetermined portion of terms in the group of media entities. In another more particular example, the similarity criterion can be satisfied when the document includes each of the media entities in the group of media entities or a similar media entity (e.g., a synonym). In yet another more particular example, the similarity criterion can be satisfied when the document describes each of the media entities in the group of media entities.

Additionally or alternatively, in some implementations, the topic score can incorporate other scores, such as the relevancy score associated with each web search result. For example, upon determining that a particular entity occurs in particular web search results, the topic score can include an average of the relevancy scores associated with each of the particular web search results. In another example, the count values can be weighted based on the relevancy scores associated with each of the particular web search results.

Turning to FIG. 5B, in some implementations, one or more media entities can be selected based on topic score at 540. For example, the extracted media entities can be selected by ranking the media entities by topic score and selecting the top N highest media entities. In another example, the extracted media entities can be selected by determining whether the topic score is greater than a particular threshold value. If the topic score is greater than the particular threshold value, the media entity can be retained for use in generating a subsequent search query. Otherwise, media entities having topic scores less than the particular threshold value can be discarded. Alternatively, in some implementations, all of the media entities or groups of media entities can be used.

At 545, a search of a second corpus of resources can be performed. As described above, in some implementations, the second corpus can include any suitable type of content, such as media content, and the second corpus of resources can be different from the first corpus of resources e.g., web resources). More particularly, a media search query can be generated based on the selected media entities and the second corpus of resources can be searched for media content responsive to the search query. In some implementations, multiple search queries can be generated based on the selected media entities, where a portion of media entities is used in one search query and a different portion of media entities is used in another search query.

At 550, media assets or other suitable content that are responsive to the search query based on the selected media entities can be identified. For example, in response to transmitting a search query to indexing database 150 (FIG. 1), multiple pieces of media content can be identified. In a more particular example, the search result can include an identifier associated with a media content item. The identifier can be a link to the media content, a unique content identifier for accessing the media content in a media database, a title of the media content, a file name associated with the media content, or any other suitable identifier.

In some implementations, media quality scores can be used to rank and/or filter the media assets at 555. As described above, media quality scores can be retrieved from a suitable source, such as media quality database 160, and each media quality score can be associated with a particular media asset. These media quality scores can include an indication of popularity (e.g., the number of times users have selected a content item), an indication of the quality of the video or audio in a content item, an indication of the availability of a content item, or any other suitable quality metric. In addition, media assets can be ranked and/or filtered by using topic scores associated with a media entity that was used in the search query that resulted in the identification of the media asset, relevancy scores associated with a document where a media entity was identified, etc.

Additionally or alternatively, learning techniques can be applied to the identified media assets. For example, in response to identifying particular media assets, a click-through rate of the media assets presented as search results can be determined. In response to determining that the click-through rate of a particular media asset when presented as a search result is low (e.g., which may indicate that it is a less relevant result for the given search query), one or more learning techniques can be used such that the media asset can be assigned a lower ranking or discarded from the presented search results. On the other hand, in response to determining that the click-through rate of a particular media asset when presented as a search result is high, one or more learning techniques can be used such that the media asset can be promoted to the top of the listing of search results.

In some implementations, based on media quality scores and/or other scores, the media assets can be ranked at 560 and a subset of the media assets can be selected based on the ranking at 565. For example, the media assets can be selected by ranking the media assets by media quality score and selecting a predetermined number of media assets having the highest media quality scores. In another example, the media assets can be selected by determining whether the media quality score is greater than a particular threshold value. Alternatively, all of the media assets can be selected for presentation to the user. In yet another example, the media assets can be selected based on client device information (e.g., screen size, user profile information, etc.).

In some implementations, additional content items can be added to the subset of media assets. For example, a portion of the web search results from 520 can be added to the subset of media assets, such that media identifiers and web links responsive to the media search query can be provided to the user. In another example, a different media search can be performed, such as a title-based media search through a media data feed, and a portion of the title-based media search can be added to the subset of media assets, such that media identifiers from different media searches can be provided to the user. In yet another example, media searches through different sources can be performed such that media search results from different sources and different corpuses can be provided to the user. In a further example, the user of the client device can indicate particular sources for providing additional search results (e.g., a particular search engine, a particular source of media content, etc.).

At 570, the subset of identified media assets (and any other suitable content) can be presented to the user. For example, in response to receiving the media search query, a graphical user interface can be presented to the user that includes media identifiers corresponding to each of the identified media assets. In response to receiving a user selection of a media identifier, the client device, such as client device 110 that provided the media search query, can transmit a request to a service provide or any other suitable content source for the selected media asset. For example, upon selecting a media identifier associated with a media asset (e.g., selecting "Mathilda: The Professional" from interface 220), the client device can provide the user with an opportunity to set a reminder for the media asset, record the media asset, tune to a channel providing the media asset (if currently available), purchase and/or retrieve the media asset (e.g., from a video-on-demand service, from an over-the-top content provider, etc.), etc.

Accordingly, methods, systems, and media for providing a media search engine are provided.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 5A and 5B can be executed or performed in any order or sequence not limited to the order and sequence shown and described in the figures. Also, some of the above steps of the processes of FIGS. 5A and 5B can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosed subject matter has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A system for searching for content, the system comprising:
a hardware processor that:
receives a query for one or more media assets;
determines keyword information from at least a portion of web search results that are responsive to the query;
determines entity information from at least a portion of the keyword information;
selects an entity from the entity information based on occurrence in the web search results; and
causes a media asset corresponding to the selected entity to be presented in response to the query.

2. The system of claim 1, wherein the entity information includes media entity information.

3. The system of claim 1, wherein the hardware processor further identifies the media asset based on the selected entity.

4. The system of claim 1, wherein the hardware processor further identifies a plurality of web search results from a corpus of web resources that are responsive to the query.

5. The system of claim 4, wherein the hardware processor further rewrites the query by inserting one or more media terms prior to identifying the plurality of web search results from the corpus of web resources.

6. The system of claim 1, wherein the hardware processor further:
assigns a topic score for the each of the entity information based on occurrence in the portion of web search results; and
increments the topic score for an entity upon determining that a page corresponding to a web search result relates to the entity;
wherein the entity is selected from the entity information based on the topic score.

7. The system of claim 1, wherein a plurality of media assets are identified based on the selected entity and wherein a subset of the plurality of media assets are presented in response to the query.

8. The system of claim 7, wherein the hardware processor further:
determines a quality score for each of the plurality of identified media assets; and
filters the at least a subset of the plurality of media assets based on the determined quality score.

9. The system of claim 1, wherein the hardware processor further accesses an entity table that maps a web resource identifier corresponding to a web search result to an entity, wherein the web resource identifier comprises a link to a related website.

10. A method for searching for content, the method comprising:
receiving, using a hardware processor, a query for one or more media assets;
determining, using the hardware processor, keyword information from at least a portion of web search results that are responsive to the query;
determining, using the hardware processor, entity information from at least a portion of the keyword information;
selecting, using the hardware processor, an entity from the entity information based on occurrence in the web search results; and
causing, using the hardware processor, a media asset corresponding to the selected entity to be presented in response to the query.

11. The method of claim 10, wherein the entity information includes media entity information.

12. The method of claim 10, further comprising identifying the media asset based on the selected entity.

13. The method of claim 10, further comprising identifying a plurality of web search results from a corpus of web resources that are responsive to the query.

14. The method of claim 13, further comprising rewriting the query by inserting one or more media terms prior to identifying the plurality of web search results from the corpus of web resources.

15. The method of claim 10, further comprising:
assigning a topic score for the each of the entity information based on occurrence in the portion of web search results; and
incrementing the topic score for an entity upon determining that a page corresponding to a web search result relates to the entity;
wherein the entity is selected from the entity information based on the topic score.

16. The method of claim 10, wherein a plurality of media assets are identified based on the selected entity and wherein a subset of the plurality of media assets are presented in response to the query.

17. The method of claim 16, further comprising:
determining a quality score for each of the plurality of identified media assets; and
filtering the at least a subset of the plurality of media assets based on the determined quality score.

18. The method of claim 10, further comprising accessing an entity table that maps a web resource identifier corresponding to a web search result to an entity, wherein the web resource identifier comprises a link to a related website.

19. A non-transitory computer-readable medium containing computer-executable instructions that, when executed by a processor, cause the processor to perform a method for searching for content, the method comprising:
receiving a query for one or more media assets;
determining keyword information from at least a portion of web search results that are responsive to the query;
determining entity information from at least a portion of the keyword information;
selecting an entity from the entity information based on occurrence in the web search results; and
causing a media asset corresponding to the selected entity to be presented in response to the query.

* * * * *